(12) United States Patent  
Breuning et al.

(10) Patent No.: US 6,263,997 B1  
(45) Date of Patent: Jul. 24, 2001

(54) MOTOR VEHICLE WITH AT LEAST ONE PART WHICH CAN BE CONTROLLED BY AT LEAST ONE OPERATING LEVER

(75) Inventors: Edwin Breuning, Denkendorf; Ruediger Rachel, Esslingen, both of (DE)

(73) Assignee: Mercedes-Benz Lekungen GmbH, Duesseldorf (DE)

( * ) Notice: Subject to any disclaimer, the term of this patent is extended or adjusted under 35 U.S.C. 154(b) by 0 days.

(21) Appl. No.: 09/402,136

(22) PCT Filed: Mar. 7, 1998

(86) PCT No.: PCT/EP98/01344

§ 371 Date: Jan. 6, 2000

§ 102(e) Date: Jan. 6, 2000

(87) PCT Pub. No.: WO98/43863

PCT Pub. Date: Oct. 8, 1998

(30) Foreign Application Priority Data

Mar. 29, 1997 (DE) .............................. 197 13 245

(51) Int. Cl.[7] .................................................. B60K 26/00
(52) U.S. Cl. ........................................ 180/402; 180/315
(58) Field of Search ..................... 180/402, 403, 180/315, 332, 333, 334; 74/471 XY, 471 R, 491, 504

(56) References Cited

U.S. PATENT DOCUMENTS

| 4,297,845 | * | 11/1981 | Kyster ................................. 60/384 |
| 5,228,356 | * | 7/1993 | Chuang ........................... 74/471 XY |
| 6,039,142 | * | 3/2000 | Eckstein et al. ..................... 180/333 |

FOREIGN PATENT DOCUMENTS 0 493 795   7/1992 (EP) .

OTHER PUBLICATIONS

Bolte, Uwe, "Das Aktive Stellteil—ein ergonomisches Bedienkonzept, In: Fortschritt Berichte BDE, Reihe 17: Biotechnik, Nr. 75", 1991, VDI–Berlag, Duesseldorf, Germany.

"Une Saab Sans Volant" Ingenieurs de L'Automobile, No. 671, 1992.

* cited by examiner

Primary Examiner—Kevin Hurley  
(74) Attorney, Agent, or Firm—Crowell & Moring, L.L.P.

(57) ABSTRACT

A positioning device for adjusting a motor vehicle operating lever with feedback from the respective position of a controllable part. At least one part is controllable by at least one operating lever in the form of a so-called side-stick. The motor vehicle steerable wheels can be, in particular, the controllable part.

19 Claims, 1 Drawing Sheet

MOTOR VEHICLE WITH AT LEAST ONE PART WHICH CAN BE CONTROLLED BY AT LEAST ONE OPERATING LEVER

BACKGROUND OF THE INVENTION

This application claims the priority of International Application PCT/EP98/01344, filed Mar. 7, 1998, and German patent 197 13 245.6, filed Mar. 29, 1997, the disclosure of which are expressly incorporated by reference herein.

Modern motor vehicles usually have, as the operating elements, a steering wheel and various pedals, in particular brake pedal and accelerator pedal. By way of their connection to the parts which they activate these operating elements are also suitable for providing feedback on the position set for the particular part or for the driving condition of the vehicle. This particularly applies to the steering wheel because, in the case of steering, there is no inactive condition and there is a direct and noticeable mutual relationship between the steering wheel and the position of the wheels.

In such a the vehicle, but particularly in passenger cars, the steering wheel also frequently represents an annoying element, not only because of its substantial spatial requirement but also because of its position, fixed for handling reasons, in front of the driver as the operating person.

There has, therefore, been no lack of attempts in motor vehicle design to realize a steering system in the form of operating levers as so-called side-sticks, somewhat analogous to aircraft construction. The operating relationships are by no means directly comparable, both with regard to the space available and also because of a much higher degree of orientation based on instruments in the case of aircraft operation.

In addition, the steering wheel in motor vehicles is also used, often enough, as a support for the hands, as an aid in getting out or the like. This, in association with the actuation of parts by operating levers involves particular difficulties at least if there is no positive connection between the operating lever and the part to be controlled resulting in a direct association of the respective positions, such as is provided with mechanical connections between the steering wheel and the wheels and, therefore, permitting conclusions to be drawn with respect to the position of the part to be controlled from the position of the operating lever.

SUMMARY OF THE INVENTION

The present invention relates to operating lever actuation systems for motor vehicles, in particular for the steered wheels of motor vehicles, in which a positive connection of the operating lever to the part to be controlled and therefore an association of the positions with mechanical or hydraulic apparatus is not provided. This is, for example, the case in the so-called "steer-by-wire" steering systems, i.e. steering systems in which the control instructions are transmitted electrically between an operating element, i.e. an operating lever or a steering wheel, and the corresponding wheel to be steered.

With respect to such operating lever actuation systems in which the movement of the operating lever is virtually independent of the respective part to be controlled, an object of the present invention is to ensure a feedback for making the position of the operating lever to correspond to the position of the respective part which can be controlled or has to be adjusted and, in fact, notwithstanding any forces exerted on the operating lever which have nothing to do with the actual operating function.

This object has been achieved in accordance with the present invention by providing that the control instructions are recorded by a sensor system associated with the operating lever. The sensor system is so placed and/or configured with respect to the actuation and/or arrangement that the forces exerted on the sensor system for control purposes have to be specifically applied and cannot, at least in the usual case, be caused by forces which are exerted on the operating lever for other reasons, be it for support or for other purposes.

Consequently, the operating lever can only be displaced from its basic position by way of the feedback and to match the position of the respectively activated part. The servomotor effecting this adjustment is connected to the operating lever via a gearbox, which not only ensures the necessary, small-step and also, in view of the small adjustment path of an operating lever, sensitive adjustment but also ensures a sufficiently large holding torque in order, in association with the holding force of the motor, to exclude movements of the operating lever resulting from forces not caused by the feedback.

As a gearbox suitable for the foregoing purpose and to be employed in accordance with the present invention, a gearbox, particularly a harmonic drive gearbox, is provided to permit correspondingly high transmission ratios and also, in association there with, correspondingly high holding torques in the opposite direction in the case of a drive by a commercial, small-size and high-speed electric motor with a comparatively small drive power.

An operating unit of this configuration is also characterized by a very low space requirement. This feature is of substantial importance given the restricted spatial conditions in motor vehicles. It also expediently forms an assembly unit with which can be coaxially arranged with a control unit activating the servomotor with feedback from a position pick-up associated with the adjustable part and, if appropriate, an additional brake.

Such an operating unit is advantageous in particular in the so-called "steer-by-wire" steering systems in motor vehicles, particularly as commercially available elements can be used for the overall configuration. These commercially available elements ensure a high level of operating reliability and, because of the small installation volume achieved, can also be employed redundantly, if required.

Other objects, advantages and novel features of the present invention will become apparent from the following detailed description of the invention when considered in conjunction with the accompanying drawings.

DETAILED DESCRIPTION OF THE DRAWINGS

Figure 1:
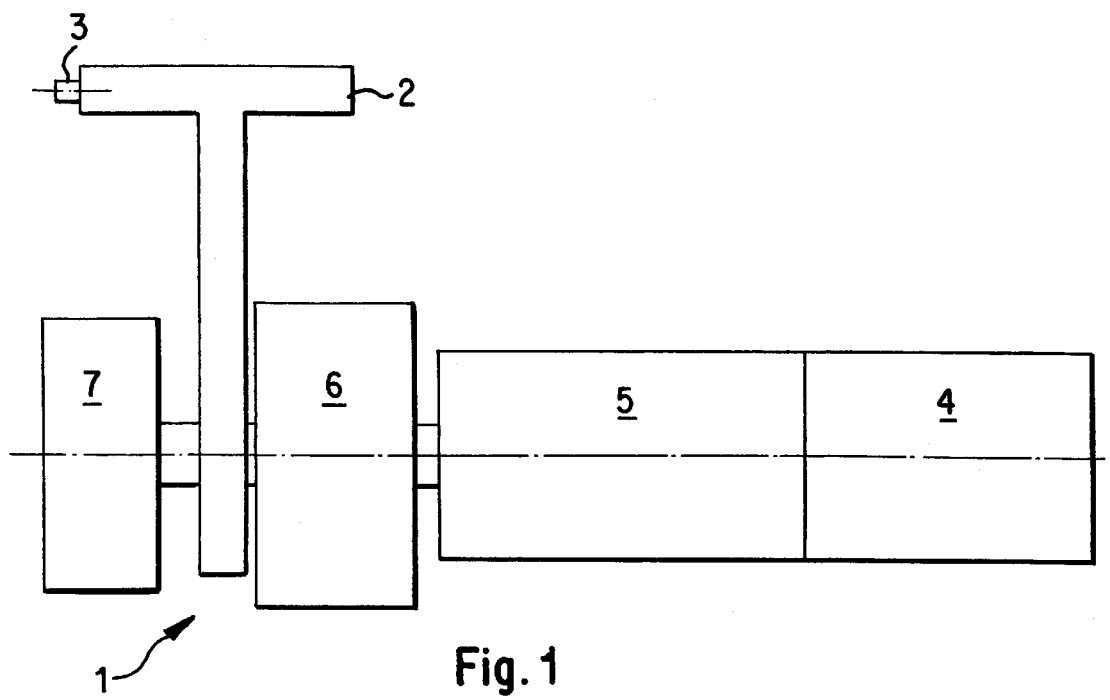
FIG. 1 is a schematic overall representation of an operating lever in the form of a side-stick with positioning device.

In FIG. 1, a positioning device designated generally by numeral 1, has an operating lever 2 in the form of a side-stick, which is displaced with feedback from an adjustable part (not shown here), for example the wheels of a steerable axle of a motor vehicle, corresponding to the adjustment position of these wheels from a basic or normal position, which would correspond to the straight-ahead direction in the case of steerable wheels. Thereby, the respective operating person can quasi-experience the adjustment position of the wheels, i.e. the wheel turning angle, from the position of the side-stick 2. The control instructions for the part to be respectively adjusted, in the case of steerable wheels as the adjustable part, therefore, the control instructions for the respective angle of lock, are then preferably provided at the operating lever end as a function of force and recorded by a sensor by way of a control slide 3 provided on the operating lever 2. The instructions are fed as steering instructions to a positioning appliance associated with the wheels so that the wheels are correspondingly locked.

The respective angle of lock is in turn recorded, and the corresponding signals are fed to a required value pick-up, which is here designated by numeral 4 and is configured as an incremental pick-up or, preferably, as a resolver. The servomotor 5 is activated by this required value pick-up 4 as control means. The operating lever 2, which is configured as a side-stick, is adjusted by this motor 5 via a gearbox 6 corresponding to the adjustment position of the respective wheel with feedback from the latter.

In order to achieve a positioning device of small installation volume, an electric motor is preferably used as the servomotor 5 and rotates at a relatively high speed, e.g. rotational speeds in the range of more than 1500 rpm.

Corresponding to the high motor speed, the gearbox 6 must have a large step-down ratio, e.g. a step-down ratio of at least 50:1. The operating lever 2 is adjusted by the output shaft of the gearbox 6, although the output shaft of the gearbox can simultaneously form the supporting shaft for the operating lever 2.

Because, particularly in motor vehicles, forces are also exerted or can be exerted on the operating lever 2 which do not serve for the initiation of control instructions and because the position of the operating lever, which is also adjusted by the feedback from the respective part to be adjusted, (i.e. for example from the wheels) should not be able to be changed by such forces either, relatively large holding torques have to be produced by the gearbox 6 and the holding force of the motor 5. This is possible within wide limits given corresponding configuration and selection of the gearbox 6 and the servomotor 5.

In order to be able to secure against extreme loads exceeding these torques, for example due to unintentional support taken on the operating lever 2 in an emergency braking action in motor vehicles, a brake 7 is additionally provided within the framework of the invention. This brake interacts with the operating lever 2 directly or via the gearbox output shaft. The fixed location brake 7 can be arranged opposite to the gearbox 6, relative to the operating lever 2 or can also be installed between the gearbox 6 and the servomotor 5.

In the positioning device according to the present invention, the required value pick-up 4, the servomotor 5, the gearbox 6, the operating lever 2 and the brake 7 are arranged coaxially and form a unit of small installation volume which can be assembled from largely commercially available structural elements. The small installation size of the elements of the positioning device 1 associated with the operating lever 2 then also makes a redundant arrangement of these possible, should this be necessary.

In the simplest form, this redundancy can be done by a mirror-image arrangement around the operating lever 2. A very high degree of reliability can thus be achieved. Of course, the redundancy can be utilized to design the positioning elements associated with the operating lever 2 in such a way that they normally operate together and, in the case of a failure of one unit, the other unit undertakes an emergency function with a correspondingly reduced performance capability.

Harmonic drive gearboxes particularly come into consideration as gearboxes 6 which have a particularly small installation volume and permit very high step-down ratios and are therefore suitable to a particular extent for the use and purpose according to the invention, but Cyclo gearboxes can also be employed.

Figure 2:
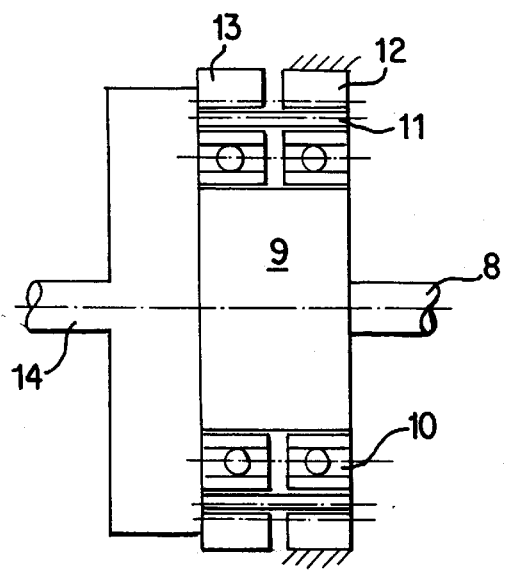
FIG. 2 is a schematic view of the gearbox used in the positioning device and connected at the output end to the side-stick of FIG. 1.

FIG. 2 shows, also diagrammatically, a cross section through such a harmonic drive gearbox 6, having an input shaft 8 for driving an elliptical eccentric disc 9. An elastic sleeve 11 with external teeth is rotatably supported on this eccentric disc 9 by way of a bearing 10. The support takes place in the region of the major axis of the ellipse which is dimensioned so that the elastic sleeve 11, which has external teeth, is in engagement with the internal teeth of hollow wheels 12, 13 in the respective support region.

The number of teeth of the elastic sleeve 11 with external teeth is smaller than the number of teeth of the hollow wheels 12, 13. With, for example n teeth of the elastic sleeve 11, the hollow wheels 12, 13 have n+2 teeth. Of the hollow wheels, the hollow wheel 12 is fixed relative to the casing, i.e. cannot be rotated, whereas the adjacent output-end hollow wheel 13 is supported so that it can rotate in the casing and is connected to the output shaft. The output shaft is designated by numeral 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having at least one part controllable by at least one operating lever configured as a side-stick through which control instructions can be input, and recorded at an operating lever end thereof, as a function of force, the at least one operating lever being adjustable, with feedback from a part addressed by the control instructions and in accordance with the control instructions, into a position corresponding to a respective adjustment position of the part, a control structure actuating the at least one controllable part via a servomotor configured to be activated corresponding to an adjustment position of the part by the control structure, driving the at least one operating lever via an adjustment gearbox configured as a planet-type gearbox having a large transmission ratio.

2. The motor vehicle according to claim 1, wherein the gearbox is a harmonic drive gearbox.

3. The motor vehicle according to claim 1, wherein the control structure comprises a required value pick-up.

4. The motor vehicle according to claim 3, wherein the required value pick-up is an incremental pick-up.

5. The motor vehicle according to claim 3, wherein the required value pick-up is a resolver.

6. The motor vehicle according to claim 3, wherein the gearbox, the servomotor and the required value pick-up are co-axially arranged.

7. The motor vehicle according to claim 6, wherein the gearbox is connected at an input end thereof to the servomotor and, is connected at an output end thereof to the at least one operating lever.

8. The motor vehicle according to claim 7, wherein the at least one operating lever is arranged on an output shaft of the gearbox.

9. The motor vehicle according to claim 1, wherein a brake is arranged co-axially with the gearbox.

10. The motor vehicle according to claim 9, wherein the control structure comprises a required value pick-up.

11. The motor vehicle according to claim 9, wherein the brake is arranged between the gearbox and the servomotor.

12. The motor vehicle according to claim 9, wherein the brake is arranged on a side of the at least one operating lever opposite the gearbox.

13. The motor vehicle according to claim 1, wherein the gearbox has an elliptical eccentric disc connected to an input shaft, an elastic sleeve with external teeth rotatably supported by bearings on an elliptical eccentric disc in a region of a major axis of the eccentric disc, and hollow wheels, with internal teeth, in which one wheel is fixed relative to a casing of the gearbox and the other wheel is the output.

14. The motor vehicle according to claim 1, wherein steerable wheels of at least one motor vehicle axle comprise the controllable part.

15. The motor vehicle according to claim 14, wherein the gearbox is a harmonic drive gearbox.

16. The motor vehicle according to claim 15, wherein the control structure comprises a required value pick-up.

17. The motor vehicle according to claim 16, wherein a brake is arranged co-axially with the gearbox.

18. The motor vehicle according to claim 17, wherein the brake is arranged on a side of the at least one operating lever opposite the gearbox.

19. The motor vehicle according to claim 18, wherein the gearbox has an elliptical eccentric disc connected to an input shaft, an elastic sleeve with external teeth rotatably supported by bearings on an elliptical eccentric disc in a region of a major axis of the eccentric disc, and hollow wheels, with internal teeth, in which one wheel is fixed relative to a casing of the gearbox and the other wheel is the output.

* * * * *